United States Patent
Lee et al.

(10) Patent No.: US 9,646,728 B2
(45) Date of Patent: May 9, 2017

(54) PLASMA WELDING APPARATUS FOR GUIDE THIMBLE AND GUIDE THIMBLE END PLUG OF NUCLEAR FUEL ASSEMBLY

(71) Applicant: KEPCO NUCLEAR FUEL CO., LTD., Daejeon (KR)

(72) Inventors: Ju Young Lee, Chungcheongnam-do (KR); Chang Hwan Hwang, Daejeon (KR); Hung Soon Chang, Daejeon (KR); Soon Ki Guk, Daejeon (KR); Tae Hyung Na, Daejeon (KR); Yeong Seon Oh, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 738 days.

(21) Appl. No.: 14/149,102

(22) Filed: Jan. 7, 2014

(65) Prior Publication Data

US 2014/0190945 A1      Jul. 10, 2014

(30) Foreign Application Priority Data

Jan. 8, 2013  (KR) .................. 10-2013-0002089

(51) Int. Cl.
*B23K 10/00*        (2006.01)
*G21C 21/00*        (2006.01)
(Continued)

(52) U.S. Cl.
CPC ............ *G21C 21/00* (2013.01); *B23K 10/006* (2013.01); *B23K 10/02* (2013.01);
(Continued)

(58) Field of Classification Search
CPC ....... F21C 21/00; B23K 10/02; B23K 10/006; B23K 37/0211; G21C 3/334; Y02E 30/40
(Continued)

(56) References Cited

U.S. PATENT DOCUMENTS 3,725,635 A * 4/1973  Fink ........................ B23K 10/02
                                                    219/121.11
4,075,454 A * 2/1978  Duncan .................... G21C 3/10
                                                    219/137 R
(Continued)

FOREIGN PATENT DOCUMENTS

FR       2966760  A1     5/2012
JP     H 0648310  B2     6/1994
(Continued)

OTHER PUBLICATIONS

Abstract of Hanjie Jiegou Zhizao Gongyi Shiyong Shouce, China Machine Press.
(Continued)

*Primary Examiner* — Mark Paschall
(74) *Attorney, Agent, or Firm* — Rabin & Berdo, P.C.

(57) ABSTRACT

Disclosed is a plasma welding apparatus for a guide thimble and guide thimble end plug of a nuclear fuel assembly, which includes: a welding chamber (100) includes an end-plug inserting part (110) into which the end plug (10) is inserted, a guide-thimble inserting part (120) which is provided on the same axis as the end-plug inserting part (110) and into which the guide thimble (20) is inserted and fixed, a torch assembling part (130) to which a plasma welding torch (131) is assembled so as to make a right angle with the end-plug inserting part (110) and the guide-thimble inserting part (120), and argon inflow and outflow ports (141, 142) through which argon is supplied or discharged; an end-plug transfer unit (210) supplying the end plug (10) to the end-plug inserting part (110); and an guide-thimble transfer unit (220) transferring the guide thimble (20) to the guide-thimble inserting part (120).

9 Claims, 5 Drawing Sheets (51) Int. Cl.
*B23K 10/02* (2006.01)
*B23K 37/02* (2006.01)
*G21C 3/334* (2006.01)

(52) U.S. Cl.
CPC .......... *B23K 37/0211* (2013.01); *G21C 3/334* (2013.01); *Y02E 30/40* (2013.01)

(58) Field of Classification Search
USPC .......................... 219/121.45, 121.46, 137 R
See application file for complete search history.

(56) References Cited

U.S. PATENT DOCUMENTS

| | | | | |
|---|---|---|---|---|
| 4,672,791 A | * | 6/1987 | Rieben | G21C 3/10 29/235 |
| 4,679,377 A | * | 7/1987 | Rieben | G21C 3/10 29/235 |
| 5,375,756 A | * | 12/1994 | Haughton | B23K 9/038 228/10 |

FOREIGN PATENT DOCUMENTS

| | | |
|---|---|---|
| JP | 2002-346779 A | 12/2002 |
| KR | 10-0553260 B1 | 2/2006 |
| KR | 10-0775577 B1 | 11/2007 |
| KR | 10-0775578 B1 | 11/2007 |

OTHER PUBLICATIONS

Korean Office Action dated Feb. 12, 2014.
Chinese Office Action dated Dec. 18, 2015.

* cited by examiner

PLASMA WELDING APPARATUS FOR GUIDE THIMBLE AND GUIDE THIMBLE END PLUG OF NUCLEAR FUEL ASSEMBLY

BACKGROUND OF THE INVENTION

1. Field of the Invention

The present invention relates to a plasma welding apparatus for a guide thimble and guide thimble end plug of a nuclear fuel assembly, capable of improving productivity in welding the guide thimbles and their end plugs constituting the nuclear fuel assembly.

2. Description of the Related Art

Nuclear reactors are facilities for artificially controlling a fission chain reaction of a fissionable material in order to use thermal energy generated from nuclear fission as power.

Nuclear fuel used in the nuclear reactor is manufactured by forming concentrated uranium into uniformly sized cylindrical pellets (hereinafter referred to as "sintered compacts") and then charging a plurality of sintered compacts in a fuel rod. This plurality of fuel rods constitutes a nuclear fuel assembly, wherein the fuel rods are charged in a reactor core, and are then burnt by a nuclear reaction.

Figure 1:
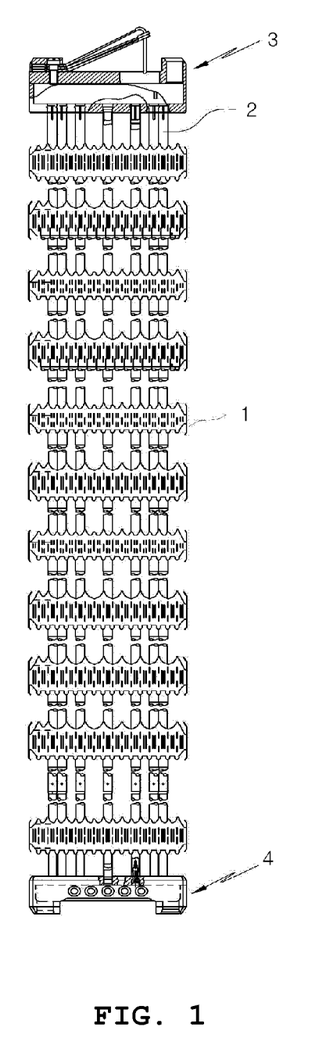
FIG. 1 shows a configuration of a typical nuclear fuel assembly.

The fuel rod assembly includes spacer grids 1 into which fuel rods are inserted, a plurality of guide thimbles (or guide tubes) 2 fixed to the spacer grids 1, an upper end fitting (or top nozzle) 3 fastened to upper ends of the guide thimbles 2, and a lower end fitting (or bottom nozzle) 4 fastened to lower ends of the guide thimbles 2. Each fuel rod is supported by dimples and springs formed on each spacer grid 1.

Particularly, each guide thimble is coupled to the spacer grid and the upper and lower end fittings so as to form a framework of the nuclear fuel assembly, and supports a load of the fuel rods within the nuclear fuel assembly. Further, each guide thimble functions as a guide channel that guides insertion of a control rod controlling output of the nuclear reactor, as well as a passage channel for a poison rod or a neutron source rod. As a material of the guide thimble, a zirconium alloy is used like a cladding tube of the fuel rod.

The guide thimble is configured so that an open lower end thereof is closed by a lower end plug. Thus, the control rod inserted into the guide thimble from the top is prevented from falling down by the lower end plug of the guide thimble.

Since the guide thimble plays a considerably important role in the nuclear reactor, it should be manufactured with high precision. Particularly, a process of coupling the end plug requires very precise work in order to secure quality. Further, the process takes a very long time when it is manually carried out.

Further, the guide thimble has a length of about four meters, and is difficult to handle. Furthermore, the guide thimble does not permit re-welding. When the guide thimble and its end plug are manually welded, this provides very low productivity, and there is a difficulty in securing a high quality.

To automatize the process of welding the guide thimble and the end plug, the applicant of the present invention has proposed an automated welding apparatus and method for the guide thimble plug of the guide thimble in the nuclear fuel assembly, which is disclosed in Korean Patent Nos. 10-0775577 and 10-0775578 (issued on Nov. 5, 2007). These patents are designed to automatically supply the guide thimbles and their end plugs to a welding chamber so as to automatize welding work in the welding chamber.

SUMMARY OF THE INVENTION

Accordingly, the present invention has been made keeping in mind the above problems occurring in the related art, and an object of the present invention is to provide a plasma welding apparatus for a guide thimble and guide thimble end plug of a nuclear fuel assembly, capable of increasing working efficiency and productivity using plasma welding rather than tungsten insert gas (TIG) welding.

To achieve the aforementioned object, there is provided a plasma welding apparatus for a guide thimble and guide thimble end plug of a nuclear fuel assembly, which includes: a welding chamber including an end-plug inserting part into which the end plug is inserted and fixed, a guide-thimble inserting part which is provided on the same axis as the end-plug inserting part and into which the guide thimble is inserted and fixed, a torch assembling part to which a plasma welding torch is assembled so as to make a right angle with the end-plug inserting part and the guide-thimble inserting part, and argon inflow and outflow ports through which argon is supplied or discharged; an end-plug transfer unit supplying the end plug to the end-plug inserting part; and an guide-thimble transfer unit transferring the guide thimble to the guide-thimble inserting part.

Here, the end-plug inserting part and the guide-thimble inserting part may be provided so as to be able to rotate relative to the welding chamber, and be rotated by a driving motor. Further, the end-plug inserting part and the guide-thimble inserting part may be assembled to the welding chamber via at least one bearing.

Further, the argon inflow and outflow ports may be configured so that argon is introduced at a lower portion of the welding chamber and is discharged to an upper portion of the welding chamber.

In addition, the guide-thimble inserting part may include a collet into which the guide thimble is inserted, a jig that horizontally moves along the collet in a forward/backward direction and provides the collet with a fastening force for fixing the guide thimble, and a lever operating the jig.

In the plasma welding apparatus for a guide thimble and guide thimble end plug of a nuclear fuel assembly according to the present invention, the end plug and the guide thimble are transferred into the welding chamber by the end-plug transfer unit and the guide thimble transfer unit, and are welded in the welding chamber by the plasma welding torch, so that the plasma welding apparatus can increase productivity. Further, to prevent oxidization during welding, the interior of the welding chamber is maintained under argon atmosphere rather than under vacuum, and the welding is carried out. Thereby, an external appearance of the weld zone and soundness of a tensile test and a corrosion test can be satisfied without requiring separate vacuum equipment.

BRIEF DESCRIPTION OF THE DRAWINGS

The above and other objectives, features and advantages of the present invention will be more clearly understood from the following detailed description when taken in conjunction with the accompanying drawings, in which.

DESCRIPTION OF THE PREFERRED EMBODIMENTS

Reference will now be made in greater detail to an exemplary embodiment of the present invention with reference to the accompanying drawings.

Figure 2:
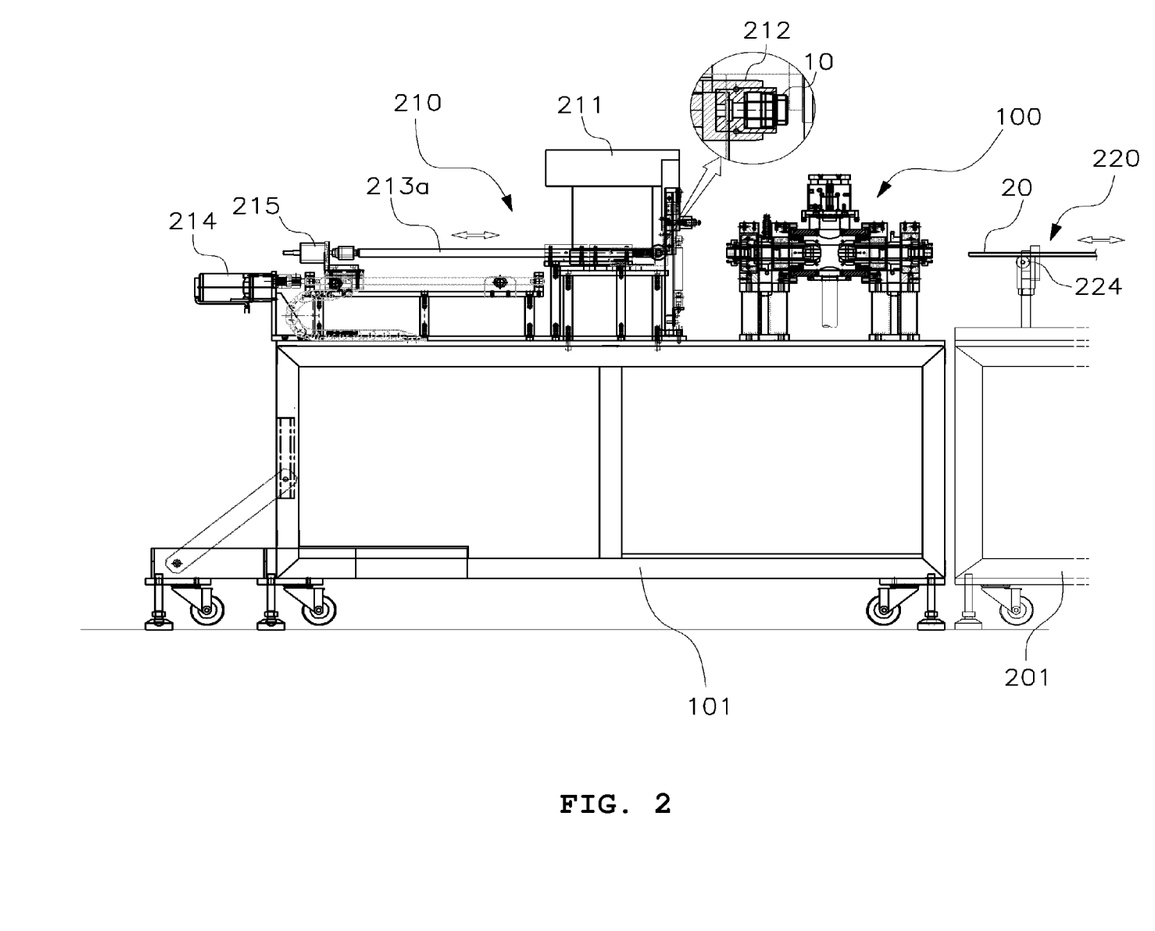
FIG. 2 is a front view of a plasma welding apparatus for a guide thimble and guide thimble end plug of a nuclear fuel assembly according to an embodiment of the present invention.
Figure 3:
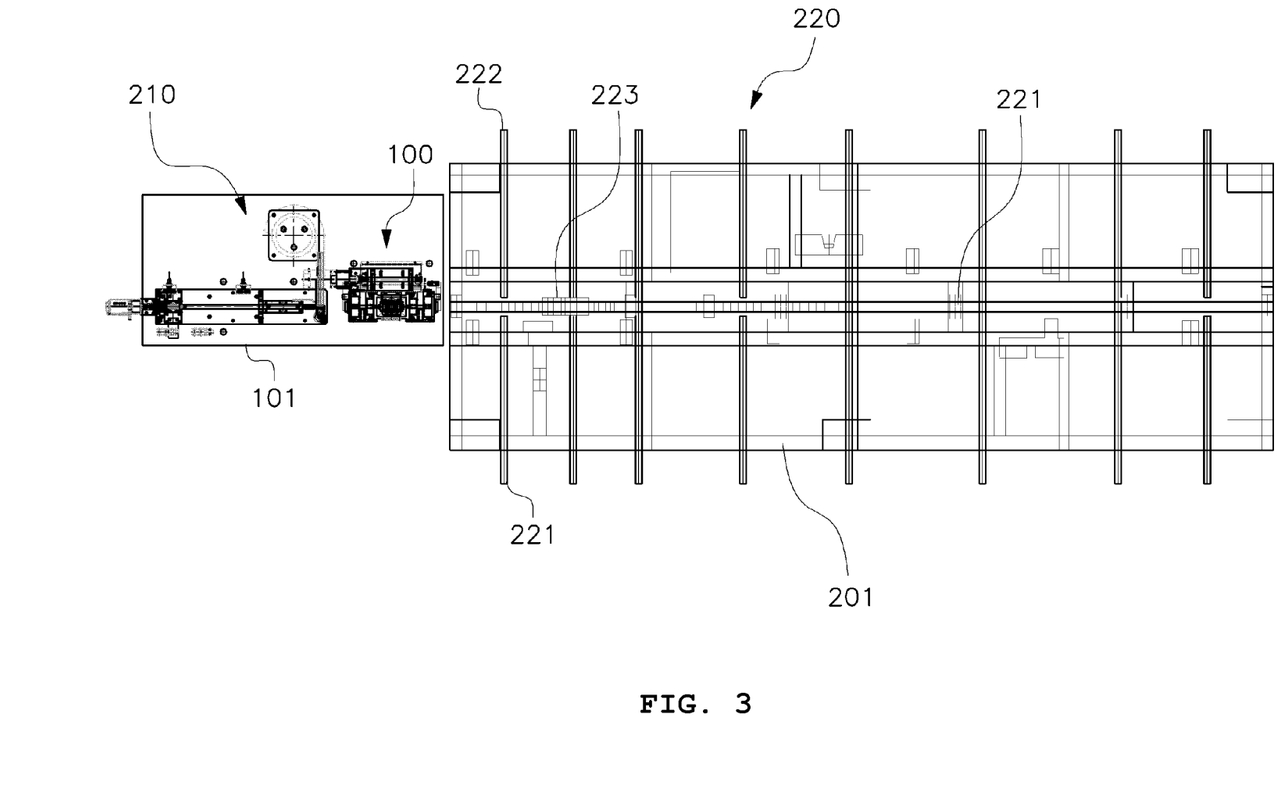
FIG. 3 is a plan view of the plasma welding apparatus according to the embodiment of the present invention.

Referring to FIGS. 2 and 3, a plasma welding apparatus for a guide thimble and guide thimble end plug of a nuclear fuel assembly according to an embodiment of the present invention includes a welding chamber 100 into which an end plug 10 and a guide thimble 20 are inserted and fixed and are subjected to plasma welding, an end-plug transfer unit 210 transferring the end plug 10 toward the welding chamber 100, and a guide-thimble transfer unit 220 that is located on an opposite side of the end-plug transfer unit 210 on the basis of the welding chamber 100 and transfers the guide thimble 20 toward the welding chamber 100.

The welding chamber 100 and the end-plug transfer unit 210 are installed on a first stationary frame 101. The end-plug transfer unit 210 includes a bowl feeder 211 that stores, automatically aligns, and feeds a plurality of end plugs, an end-plug clamp 212 that loads the end plug fed from the bowl feeder 211 and inserts and fixes the end plug into and in the welding chamber 100, and an end-plug inserting driver that is connected with the end-plug clamp 212 by a shaft 213a and drives the end-plug clamp 212 in a forward/backward direction. In the present embodiment, the end-plug inserting driver may be made up of a pneumatic cylinder 215 that primarily drives the end-plug clamp 212 in a forward/backward direction, and a servo motor 214 that precisely positions the end-plug clamp 212.

The guide-thimble transfer unit 220 is installed on a second stationary frame 201 just adjacent to the first stationary frame 101 in order to guide the long guide thimble in a horizontal direction, and is equipped with components that load/unload the guide thimble 20 toward/out of the welding chamber 100 above the second stationary frame 201.

For example, the guide-thimble transfer unit 220 includes a loading rail 221 that loads the guide thimble 20 toward the welding chamber 100 above the second stationary frame 201, an unloading rail 222 that unloads the guide thimble 20 welded with the end plug for the following process, and a guide-thimble transfer driver 223 that loads/unloads the guide thimble 20 toward/out of the welding chamber 100 between the two rails 221 and 222.

The guide-thimble transfer driver 223 is equipped with a guide-thimble clamp that grasps and fixes the guide thimble. The loading rail 221 and the unloading rail 222 are provided so as to have a smooth slope in a direction perpendicular to a transferring direction of the guide thimble. The guide thimble transferred to the loading rail 221 is loaded to the welding chamber 100 by the guide-thimble transfer driver 223, and is coupled with the end plug by plasma welding. The welded guide thimble is unloaded out of the welding chamber 100, is sent to the unloading rail 222 by the guide-thimble transfer driver 223, and is transferred to the next process along the unloading rail 222.

The guide-thimble transfer driver 223 may be provided with a plurality of idle rollers 224 that support and guide the guide thimble in a transferring direction.

Figure 4:
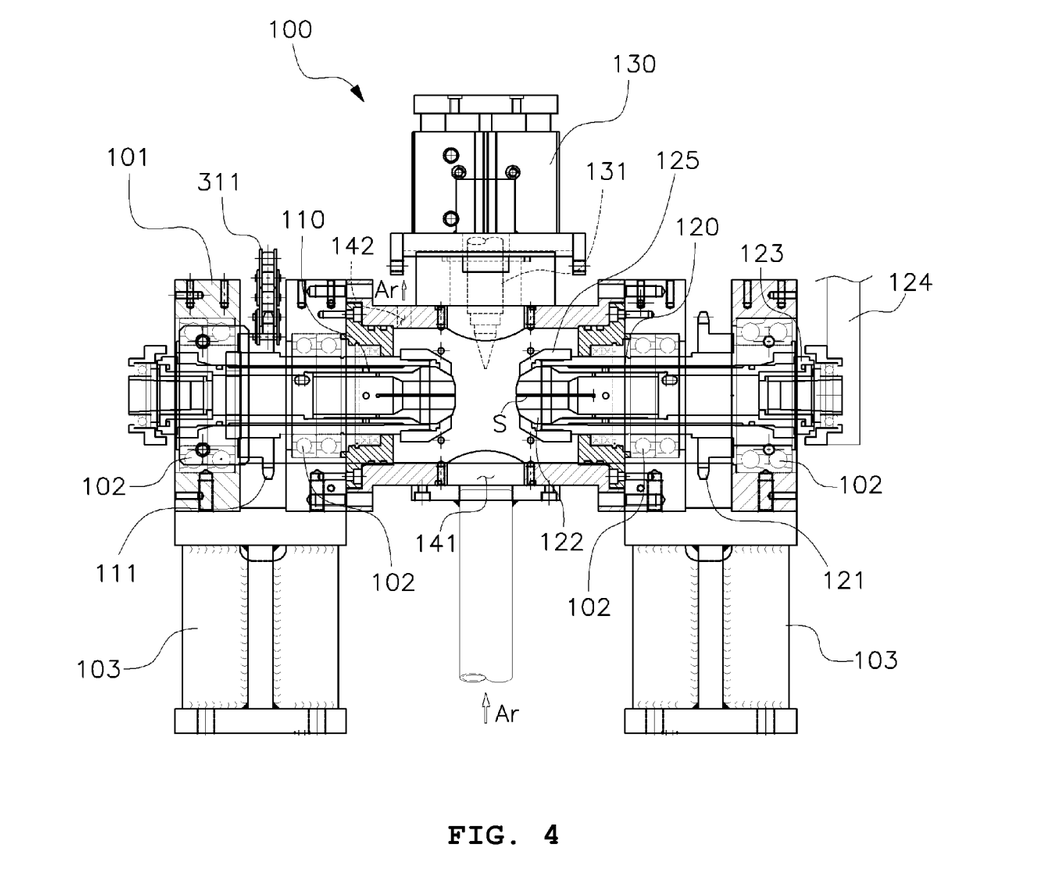
FIG. 4 is an enlarged view showing only a welding chamber in the plasma welding apparatus according to the embodiment of the present invention.

FIG. 4 is an enlarged view showing only a welding chamber of the plasma welding apparatus for a guide thimble and guide thimble end plug of a nuclear fuel assembly according to the embodiment of the present invention. The welding chamber 100 includes an end-plug inserting part 110 into which the end plug is inserted and fixed, a guide-thimble inserting part 120 which is provided on the same axis as the end-plug inserting part 110 and into which the guide thimble 20 is inserted and fixed, a torch assembling part 130 to which a plasma welding torch 131 is assembled so as to make a right angle with the end-plug inserting part 110 and the guide-thimble inserting part 120, and argon inflow and outflow ports 141 and 142 through which argon is supplied or discharged.

The welding chamber 100 has a chamber body 101 providing geometry. The chamber body 101 has the end-plug inserting part 110, the guide-thimble inserting part 120, the torch assembling part 130, and the argon inflow and outflow ports 141 and 142.

The end-plug inserting part 110 is configured so that the end pug 10 is inserted and positioned in place by forward driving of the end-plug clamp 212, and fixes and supports the end plug 10 in the welding chamber 100 during welding.

The guide-thimble inserting part 120 is provided on the same axis as the end-plug inserting part 110, and causes the guide thimble 20 to be inserted and positioned in place.

In the present embodiment, the guide-thimble inserting part 120 includes a collet 122 into which the guide thimble 20 is inserted, a jig 123 that horizontally moves along the collet 122 in a forward/backward direction and provides the collet 122 with a fastening force for fixing the guide thimble 20, and a lever 124 operating the jig 123.

The collet 122 has a plurality of slits S formed along one opening so as to provide elasticity, and is supported by a socket member 125. The jig 123 is installed on an outer circumferential surface of the collet 122, and provides the collet 122 with the fastening force for fixing the guide thimble 20 by moving relative to the collet 122 in a forward/backward direction. The lever 124 is assembled to the jig 123 for the forward/backward driving of the jig 123.

Thus, when the lever 124 is manipulated, the jig 123 presses the collet 122 toward the socket member 125, so that the collet 122 clamps and fixes the guide thimble 20. In a state in which the end plug 10 fixed to the end-plug clamp 212 is supported by a pneumatic cylinder 215, the guide thimble 20 is fixed to the collet 122. The end plug 10 and the guide thimble 20 can be welded in a joined state.

The torch assembling part 130 is located in a direction perpendicular to the end-plug inserting part 110 and the guide-thimble inserting part 120. The plasma welding torch 131 is inserted and fixed into the torch assembling part 130.

A joint of the end plug and the guide thimble inserted and fixed into the end-plug inserting part 110 and the guide-thimble inserting part 120 is located at a welding position in front of the plasma welding torch 131.

Meanwhile, the torch assembling part 130 may be additionally provided with a cylinder capable of moving the plasma welding torch 131 in an upward/downward direction. In a state in which the plasma welding torch 131 is assembled to the torch assembling part 130, the plasma welding torch 131 can be positioned in an upward/downward direction by operation of the cylinder. Further, an adjusting screw for precisely adjusting a position of the plasma welding torch 131 may be provided.

In the present embodiment, as the plasma welding torch 131, a typical plasma welding torch using known plasma arc welding may be used. High-temperature plasma of 10,000 to 30,000° C. is ejected using high-temperature flame generated by ejecting arc plasma through a narrow gap at high speed. Thereby, the welding can be carried out.

Plasma welding is similar to TIG welding in that arc is generated between a non-consumable tungsten rod and a base metal. However, in comparison with TIG welding, plasma welding has advantages in that the depth of fusion is deep, groove preparing work is reduced, and thermal deformation caused by welding heat input is reduced.

Particularly, in plasma welding, since directivity and directionality of arc are excellent, control of the welding heat to the base metal is easy, allowing precise welding. Further, a length of arc is long. If a change in the length of a large arc is allowed, an amount of molten metal according to a change in the length of arc does not show a wide difference, so a uniform weld zone can be obtained. In comparison with TIG welding, plasma welding is barely influenced by a mismatch of the weld zone or poor fit-up, can obtain high welding speed due to transmission of high-density energy, and provides excellent directivity due to having a very steady arc and being barely influenced by a magnetic field.

The argon inflow and outflow ports 141 and 142 are intended to maintain the interior of the welding chamber 100 under argon atmosphere while the end plug 10 and the guide thimble 20 are welded, and prevent oxidation of the weld zone which may be caused by exposure of the weld zone to oxygen during welding.

In the present embodiment, the argon inflow and outflow ports 141 and 142 is configured so that the inflow port 141 is provided at a lower portion of the chamber body 101, and that the outflow port 142 is provided at an upper portion of the chamber body 101. Thus, argon is introduced from the lower portion of the chamber body 101 and is discharged to the upper portion of the chamber body 101.

Above all, the end-plug inserting part 110 and the guide-thimble inserting part 120 are installed so as to be able to rotate relative to the welding chamber 100, and thus are rotated by a driving motor 310.

Figure 5:
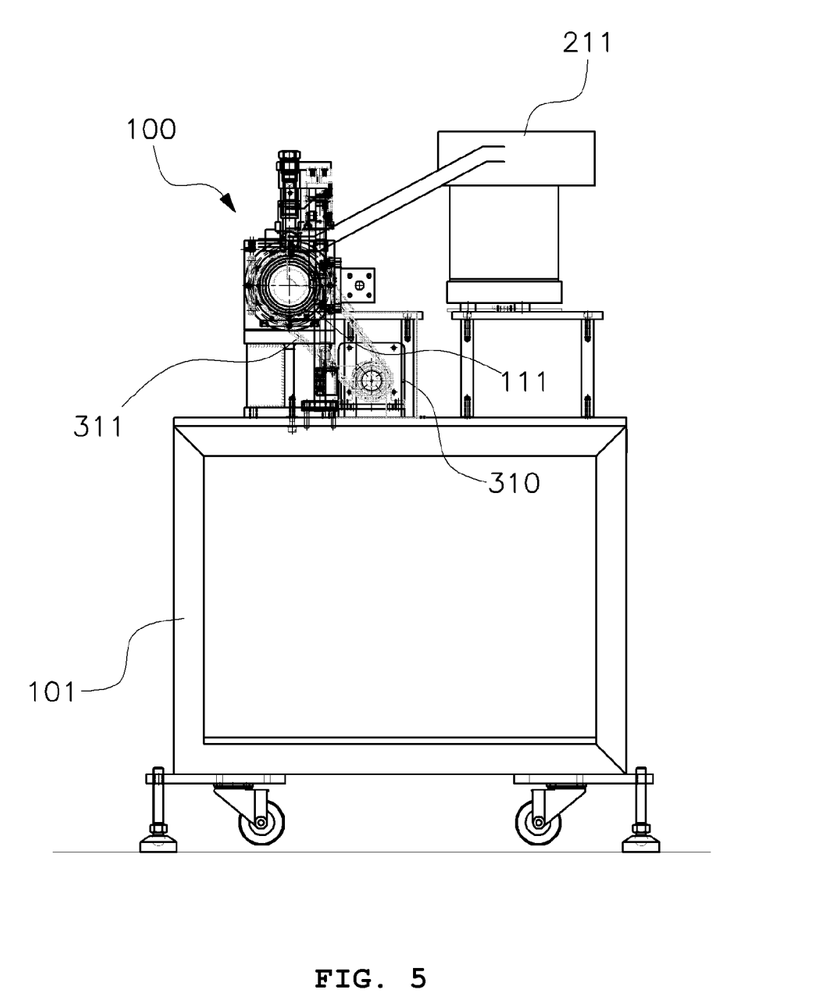
FIG. 5 is a side view of the plasma welding apparatus according to the embodiment of the present invention.

In detail, referring to FIGS. 4 and 5, a plurality of bearings 102 are installed between the chamber body 101 and the end-plug inserting part 110 and between the chamber body 101 and the guide-thimble inserting part 120. The end-plug inserting part 110 and the guide-thimble inserting part 120 are allowed to rotate relative to the chamber body 101.

Sprockets 111 and 121 are installed on outer circumferences of the end-plug inserting part 110 and/or the guide-thimble inserting part 120. The sprockets 111 and 121 may be connected with the driving motor 310 by a chain 311. Reference numeral 103 indicates a bearing case for supporting the chamber body 101 having the bearings 102, and is fixed to the first stationary frame by bolts.

Thus, when the driving motor 310 is driven after the end plug 10 and the guide thimble 20 are fixed at a welding position, a driving force of the driving motor 310 rotates the end-plug inserting part 110 and the guide-thimble inserting part 120 via the chain 311, and the joint of the end plug and the guide thimble fixed to the end-plug inserting part 110 and the guide-thimble inserting part 120 is rotated relative to the plasma welding torch 131 at a constant speed, so that the plasma welding can be performed on the joint.

A method of welding the guide thimble and the end plug using the plasma welding apparatus configured in this way is as follows.

The end plug 10 fed from the bowl feeder 211 is loaded on the end-plug clamp 212, and then is inserted into the end-plug inserting part 110 of the welding chamber 100 by the end-plug inserting driver. Further, the guide thimble 20 is inserted into the guide-thimble inserting part 120 of the welding chamber 100 by the guide-thimble transfer driver 223 of the guide-thimble transfer unit 220. The joint of the end plug 10 and the guide thimble 20 is located at a welding position in the welding chamber 100.

Next, in the state in which the plasma welding torch 131 is assembled to the torch assembling part 130, argon is supplied into the welding chamber 100 through the argon inflow and outflow ports 141 and 142, and the interior of the welding chamber 100 is maintained under argon atmosphere. A tip of the plasma welding torch 131 is positioned at the welding position.

In this state, when the driving motor 310 is driven, the end plug 10 and the guide thimble 20 fixed to the end-plug inserting part 110 and the guide-thimble inserting part 120 are rotated, and the plasma welding torch 131 is operated to weld the joint of the end plug 10 and the guide thimble 20.

After the welding is completed, the plasma welding torch 131 moves upward, and the supply of the argon into the welding chamber 100 is interrupted.

Next, the guide thimble 20 welded with the end plug is unloaded out of the welding chamber 100, and is transferred to the next process by the guide-thimble transfer unit 220.

Although not described in detail, the plasma welding apparatus of the present invention may control the driving elements so as to automatically driven by a separate controller. To this end, a variety of known operation detecting means (sensors) for detecting position and state of the driving elements may be obviously provided.

This plasma welding apparatus of the present invention can automatize the welding of the guide thimble and the end plug to increase productivity.

Since the plasma welding apparatus of the present invention uses plasma welding, it can be seen that the number of times the welding electrode is exchanged is reduced, and thus the productivity according to the automatization is increased by 100% or more, compared to the case of welding the guide thimble and the end plug using typical TIG welding.

Further, to prevent oxidization in the plasma welding process, the interior of the welding chamber is maintained under argon atmosphere rather than under vacuum, and the welding is carried out. Thereby, a complicated configuration for maintaining the vacuum can be excluded. It can be confirmed that an external appearance of the weld zone and soundness of a tensile test and a corrosion test are satisfied only by the supply of argon.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A plasma welding apparatus for a guide thimble and guide thimble end plug of a nuclear fuel assembly, comprising:
   a welding chamber including:
      an end-plug inserting part into which the end plug is inserted and fixed,
      a guide-thimble inserting part which is provided on the same axis as the end-plug inserting part and into which the guide thimble is inserted and fixed, a torch assembling part to which a plasma welding torch is assembled so as to make a right angle with the end-plug inserting part and the guide-thimble inserting part, and argon inflow and outflow ports through which argon is supplied or discharged;

an end-plug transfer unit supplying the end plug to the end-plug inserting part; and a guide-thimble transfer unit transferring the guide thimble to the guide-thimble inserting part, wherein the end-plug transfer unit and the guide-thimble transfer unit are respectively disposed at opposite sides of the welding chamber, and wherein the plasma welding torch welds the end plug to the guide thimble such that only one end of the guide thimble is closed, while another end of the guide thimble is maintained open.

2. The plasma welding apparatus set forth in claim 1, wherein the end-plug inserting part and the guide-thimble inserting part are provided so as to be able to rotate relative to the welding chamber, and are rotated by a driving motor.

3. The plasma welding apparatus set forth in claim 2, wherein the end-plug inserting part and the guide-thimble inserting part are assembled to the welding chamber via at least one bearing.

4. The plasma welding apparatus set forth in claim 1, wherein the argon inflow and outflow ports are configured so that argon is introduced at a lower portion of the welding chamber and is discharged to an upper portion of the welding chamber.

5. The plasma welding apparatus set forth in claim 1, wherein the guide-thimble inserting part includes a collet into which the guide thimble is inserted, a jig that horizontally moves along the collet in a forward/backward direction and provides the collet with a fastening force for fixing the guide thimble, and a lever operating the jig.

6. The plasma welding apparatus set for the in claim 1, further comprising:

a sprocket installed on outer circumference of the end-plug inserting part; and a chain connected to the sprocket; and a driving motor which rotates the end-plug inserting part, the driving motor generating a driving force transferred via the chain and the sprocket to the end-plug inserting part.

7. The plasma welding apparatus set for the in claim 1, wherein the guide-thimble transfer unit includes:

a guide-thimble transfer driver that loads and unloads the guide thimble toward and out of the welding chamber;

a loading rail via which the guide thimble is loaded toward the welding chamber; and an unloading rail via which the guide thimble is unloaded out of the welding chamber, the unloading rail being separated from the loading rail.

8. The plasma welding apparatus set for the in claim 7, wherein the loading rail and the unloading rail are provided to have a slope in a direction perpendicular to a transferring direction of the guide thimble.

9. The plasma welding apparatus set for the in claim 1, wherein the plasma welding torch is movable upward from the argon inflow port.

* * * * *